United States Patent
Albero et al.

(10) Patent No.: US 12,363,176 B2
(45) Date of Patent: Jul. 15, 2025

(54) SYSTEM AND METHOD FOR DATA PROTECTION IN A DISTRIBUTED NETWORK VIA RECONSTRUCTION AND ANALYSIS OF DATA SEGMENTS

(71) Applicant: BANK OF AMERICA CORPORATION, Charlotte, NC (US)

(72) Inventors: George Anthony Albero, Charlotte, NC (US); Maharaj Mukherjee, Poughkeepsie, NY (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 211 days.

(21) Appl. No.: 18/200,821

(22) Filed: May 23, 2023

(65) Prior Publication Data

US 2024/0396947 A1 Nov. 28, 2024

(51) Int. Cl.
*H04L 9/40* (2022.01)

(52) U.S. Cl.
CPC ............ *H04L 63/306* (2013.01); *H04L 63/20* (2013.01)

(58) Field of Classification Search
CPC ....... H04L 63/14–1425; H04L 63/1433; H04L 63/20; H04L 63/30; H04L 63/304–308
See application file for complete search history.

(56) References Cited

U.S. PATENT DOCUMENTS

| | | | |
|---|---|---|---|
| 4,962,532 A * | 10/1990 | Kasiraj | H04L 51/224 713/166 |
| 8,707,431 B2 | 4/2014 | Stephens et al. | |
| 8,813,234 B1 * | 8/2014 | Bowers | G06F 21/552 726/25 |
| 9,032,521 B2 | 5/2015 | Amini et al. | |
| 9,280,661 B2 | 3/2016 | Adjaoute | |
| 9,516,053 B1 | 12/2016 | Muddu et al. | |
| 9,537,886 B1 | 1/2017 | Gareau | |
| 9,565,202 B1 * | 2/2017 | Kindlund | H04L 63/145 |
| 9,692,784 B1 * | 6/2017 | Nenov | H04L 63/1416 |
| 10,270,790 B1 | 4/2019 | Jackson | |
| 10,333,971 B2 | 6/2019 | Stephan et al. | |
| 10,467,414 B1 | 11/2019 | Kindlund et al. | |
| 10,574,677 B2 | 2/2020 | Weilbacher | |
| 10,666,668 B2 | 5/2020 | Muddu et al. | |
| 11,032,307 B2 | 6/2021 | Tsironis | |
| 11,075,932 B2 | 7/2021 | Sansom et al. | |
| 11,165,815 B2 | 11/2021 | Trost et al. | |
| 11,677,772 B1 | 6/2023 | Kapoor et al. | |

(Continued)

*Primary Examiner* — Boris D Grijalva Lobos
(74) *Attorney, Agent, or Firm* — Moore & Van Allen PLLC; Andrew T. Wood

(57) ABSTRACT

Systems, computer program products, and methods are described herein for data protection in a distributed network via reconstruction and analysis of data segments. The present invention is configured to initiate a network flow analysis to assign indicators to specialized access nodes of a network diagram, execute a first cut to remove predetermined nodes, store the corresponding discrete data segments for each of the first plurality of electronic communications at the nodes, construct a first arrangement of a selected group of the corresponding discrete data segments, determine a presence of sensitive information, and construct additional arrangements of the selected group of the corresponding discrete data segments to determine a presence of sensitive information.

17 Claims, 5 Drawing Sheets

(56) References Cited

U.S. PATENT DOCUMENTS

| | | | |
|---|---|---|---|
| 2008/0313080 A1* | 12/2008 | Vasa | G06Q 20/40 709/206 |
| 2020/0204574 A1* | 6/2020 | Christian | G06F 18/23 |
| 2020/0396190 A1 | 12/2020 | Pickman et al. | |
| 2022/0391508 A1 | 12/2022 | Garchery et al. | |

* cited by examiner

```
                                                             300
                                                            ↙

┌─────────────────────────────────────────────────────────────────┐
│  ASSIGN INDICATORS TO SPECIALIZED ACCESS NODES OF A NETWORK      │
│  DIAGRAM PREDETERMINED TO HAVE SPECIALIZED ACCESS                │
│                          302                                     │
└─────────────────────────────────────────────────────────────────┘
                                │
                                ▼
┌─────────────────────────────────────────────────────────────────┐
│  EXECUTE A FIRST CUT, WHEREIN THE FIRST CUT REMOVES PREDETERMINED│
│  NODES AT EDGES TO ISOLATE FIRST SPECIALIZED ACCESS NODES        │
│                          304                                     │
└─────────────────────────────────────────────────────────────────┘
                                │
                                ▼
┌─────────────────────────────────────────────────────────────────┐
│  CAPTURE A FIRST PLURALITY OF ELECTRONIC COMMUNICATIONS AT THE   │
│  FIRST SPECIALIZED ACCESS NODES AND CORRESPONDING DISCRETE DATA  │
│  SEGMENTS                                                        │
│                          306                                     │
└─────────────────────────────────────────────────────────────────┘
                                │
                                ▼
┌─────────────────────────────────────────────────────────────────┐
│       STORE THE DISCRETE DATA SEGMENTS IN A FIRST STORAGE DEVICE │
│                          308                                     │
└─────────────────────────────────────────────────────────────────┘
                                │
                                ▼
┌─────────────────────────────────────────────────────────────────┐
│          REMOVE THE FIRST CUT AFTER A PREDETERMINED TIME INTERVAL│
│                          310                                     │
└─────────────────────────────────────────────────────────────────┘
                                │
                                ▼
┌─────────────────────────────────────────────────────────────────┐
│  EXECUTE A SECOND CUT, WHEREIN THE SECOND CUT REMOVES            │
│  PREDETERMINED NODES AT EDGES TO ISOLATE SECOND SPECIALIZED      │
│  ACCESS NODES                                                    │
│                          312                                     │
└─────────────────────────────────────────────────────────────────┘
                                │
                                ▼
┌─────────────────────────────────────────────────────────────────┐
│  CAPTURE A SECOND PLURALITY OF ELECTRONIC COMMUNICATIONS AT THE  │
│  SECOND SPECIALIZED ACCESS NODES AND CORRESPONDING DISCRETE DATA │
│  SEGMENTS                                                        │
│                          314                                     │
└─────────────────────────────────────────────────────────────────┘
                                │
                                ▼
┌─────────────────────────────────────────────────────────────────┐
│  STORE EACH OF THE DISCRETE DATA SEGMENTS IN THE FIRST STORAGE   │
│  DEVICE                                                          │
│                          316                                     │
└─────────────────────────────────────────────────────────────────┘
```

FIG. 3

SYSTEM AND METHOD FOR DATA PROTECTION IN A DISTRIBUTED NETWORK VIA RECONSTRUCTION AND ANALYSIS OF DATA SEGMENTS

FIELD OF THE INVENTION

The present invention embraces a system for data protection in a distributed network via reconstruction and analysis of data segments.

BACKGROUND

In the current landscape of data protection, entities face a significant challenge in detecting and preventing the exfiltration of confidential or proprietary information by insiders. Although various methods exist for preventing exfiltration of complete information, disparate snippets of information are still able to be exfiltrated by one or numerous insiders working in tandem across and to multiple domains or uploaded to various sites. To address the challenge of detecting and preventing insider threats, a system and method for data protection in a distributed network via reconstruction and analysis of data segments is necessary.

BRIEF SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for data protection in a distributed network via reconstruction and analysis of data segments is presented. The system may include a processing device, and a non-transitory storage device containing instructions when executed by the processing device causes the processing device to perform the steps of: initiating a network flow analysis, wherein the network flow analysis may include the steps of: assigning indicators to specialized access nodes of a network diagram comprising nodes predetermined to have specialized access, executing a first cut, wherein the first cut removes predetermined nodes at edges to isolate first specialized access nodes, capturing a first plurality of electronic communications at the first specialized access nodes, wherein each of the first plurality of electronic communications comprises a corresponding discrete data segment, and storing the corresponding discrete data segments for each of the first plurality of electronic communications in a first storage device, constructing a first arrangement of a selected group of the corresponding discrete data segments, and determining a presence of sensitive information based on the first arrangement using a sensitive information detection engine.

In some embodiments, the network flow analysis further may include the steps of: removing the first cut after a predetermined time interval executing a second cut, wherein the second cut removes predetermined nodes at edges to isolate second specialized access nodes, capturing a second plurality of electronic communications at the second specialized access nodes, wherein each of the second plurality of electronic communications comprises a corresponding discrete data segment, and storing the corresponding discrete data segments for each of the second plurality of electronic communications in the first storage device.

In some embodiments, executing the instructions further causes the processing device to perform the steps of: constructing a second arrangement of the selected group of the discrete data segments, and determining the presence of sensitive information based on the second arrangement using the sensitive information detection engine.

In some embodiments, executing the instructions further causes the processing device to perform the steps of: storing in a second storage device, for a predetermined length of time, a suspect electronic communication when the sensitive information detection engine determines the presence of sensitive information, and executing, subsequent the predetermined length of time, one selected from the group consisting of: (i) returning the suspect electronic communication to a source and (ii) completing a transfer of the suspect electronic communication to a destination.

In some embodiments, after completing the transfer of the suspect electronic communication, a retained copy of the suspect electronic communication is stored in the second storage device.

In some embodiments, the specialized access comprises an ability for the specialized access nodes to transfer electronic communication to devices in unrelated computer networks.

In some embodiments, the sensitive information detection engine comprises a machine learning engine, wherein the machine learning engine is trained using suspect electronic communications in a second storage device.

In another aspect, a computer program product for data protection in a distributed network via reconstruction and analysis of data segments is presented. The computer program product may include a non-transitory computer-readable medium including code causing an apparatus to initiate a network flow analysis, wherein the network flow analysis may include the steps of: assigning indicators to specialized access nodes of a network diagram comprising nodes predetermined to have specialized access, executing a first cut, wherein the first cut removes predetermined nodes at edges to isolate first specialized access nodes, capturing a first plurality of electronic communications at the first specialized access nodes, wherein each of the first plurality of electronic communications comprises a corresponding discrete data segment, and storing the corresponding discrete data segments for each of the first plurality of electronic communications in a first storage device, construct a first arrangement of a selected group of the corresponding discrete data segments, and determine a presence of sensitive information based on the first arrangement using a sensitive information detection engine.

In yet another aspect, a method for data protection in a distributed network via reconstruction and analysis of data segments is presented. The method may include initiating a network flow analysis, wherein the network flow analysis may include the steps of: assigning indicators to specialized access nodes of a network diagram comprising nodes predetermined to have specialized access, executing a first cut, wherein the first cut removes predetermined nodes at edges to isolate first specialized access nodes, capturing a first plurality of electronic communications at the first specialized access nodes, wherein each of the first plurality of electronic communications comprises a corresponding discrete data segment, and storing the corresponding discrete data segments for each of the first plurality of electronic communications in a first storage device, constructing a first arrangement of a selected group of the corresponding discrete data segments, and determining a presence of sensitive information based on the first arrangement using a sensitive information detection engine.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
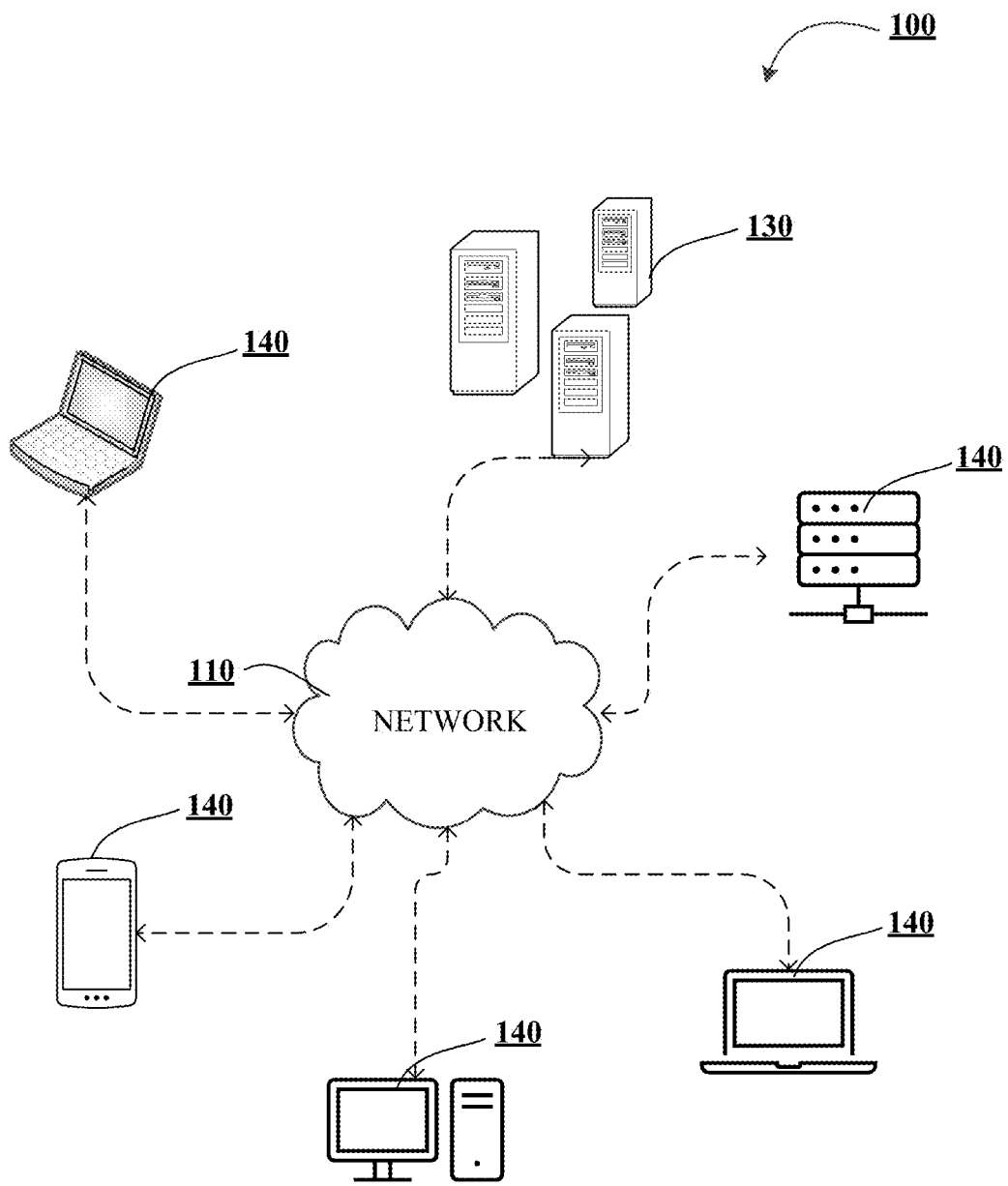
Figure 1B:
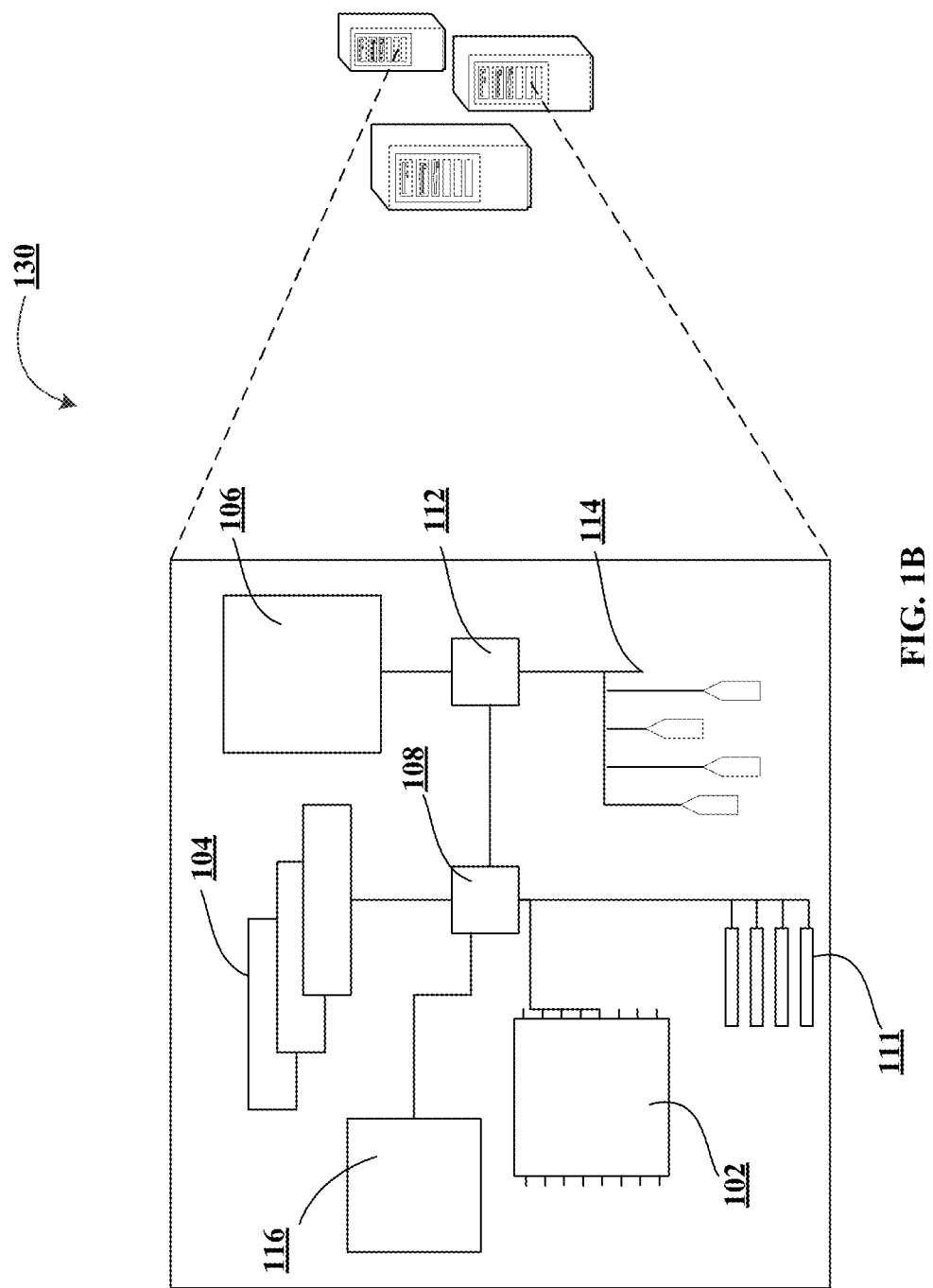
Figure 1C:
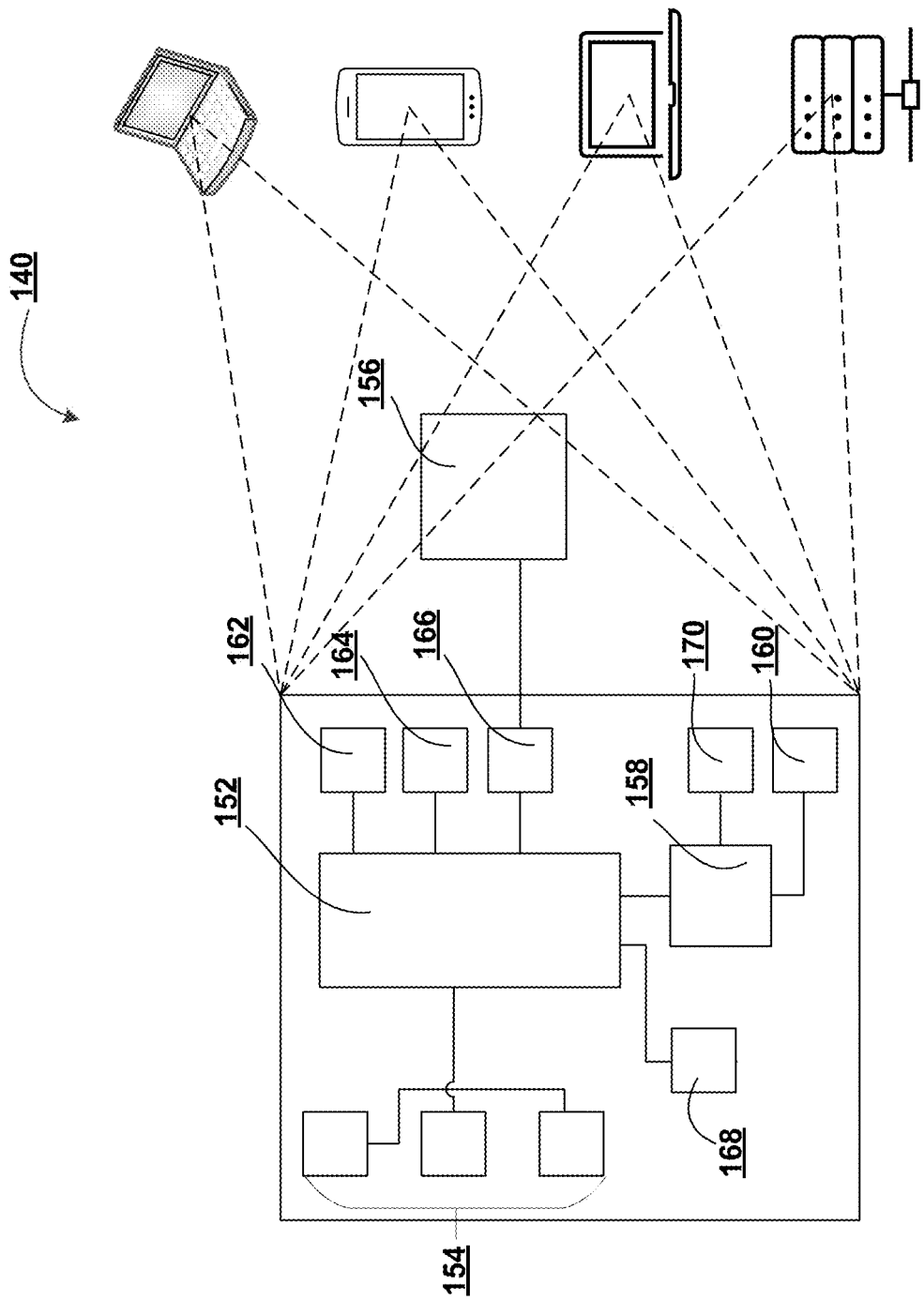
Figure 2:
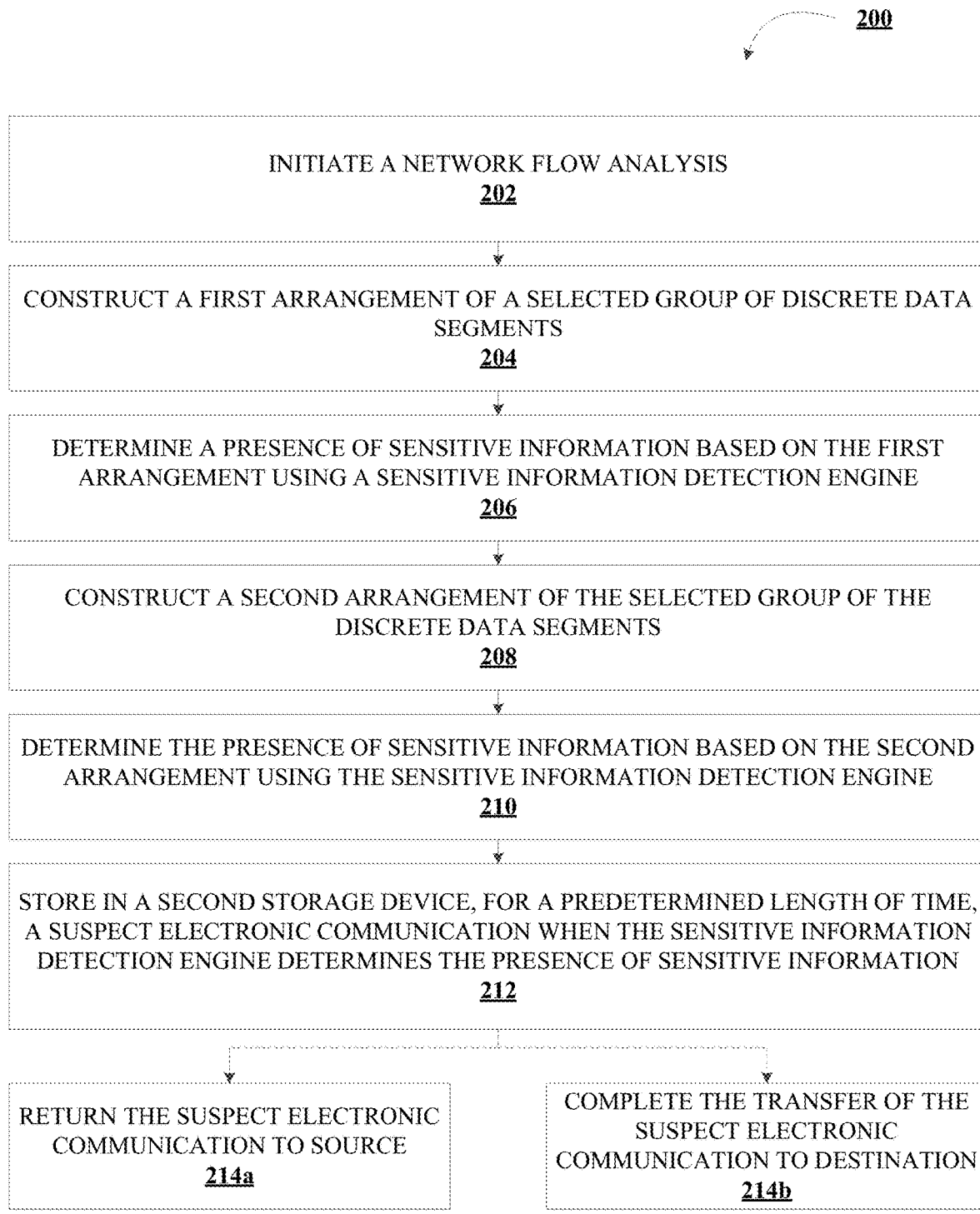

Having thus described embodiments of the invention in general terms, reference will now be made the accompanying drawings, wherein:

FIGS. 1A-1C illustrate technical components of an exemplary distributed computing environment for data protection in a distributed network via reconstruction and analysis of data segments, in accordance with an embodiment of the invention;

FIG. 2 illustrates a flow diagram for data protection in a distributed network via reconstruction and analysis of data segments, in accordance with an embodiment of the invention; and FIG. 3 illustrates a flow diagram for network flow analysis in a distributed network, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, "electronic communications" may refer to methods and technologies for transmitting, receiving, and exchanging information electronically. These methods include but are not limited to email, instant messaging, voice and video calls, text messaging, multimedia messaging, video conferencing, online chat, social media platforms, file transfer protocols, and collaborative document sharing. Such communications may be facilitated through a variety of endpoint devices, including computers, smartphones, tablets, wearable devices, and other connected gadgets. These electronic communication methods may utilize different networks and protocols, including the internet, cellular networks, Wi-Fi, short range wireless communications, and other wireless technologies.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, a "machine learning engine" refers to a computational engine that utilizes advanced algorithms and statistical techniques to automatically analyze and interpret large amounts of data, thereby enabling the system to learn patterns, make predictions, and improve performance over time without being explicitly programmed. It employs a combination of data preprocessing, feature extraction, model training, and prediction stages to extract meaningful insights from data and optimize decision-making processes. By iteratively adjusting its internal parameters based on feedback from the data, a machine learning engine can continuously refine its predictions and adapt to changing conditions, making it a valuable tool in various domains such as image recognition, natural language processing, recommendation systems, and more.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" or "user interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, a transmission of a digital audio signal, or the like. As used herein, an "interacting user" may refer to a user who is engaging in the interaction, such as a caller to a helpdesk, a customer interacting with a digital assistant, or the like.

As used herein, a "network diagram" may refer to a graphical representation that illustrates the interconnections between various components of a network system. The network diagram provides a visual overview of the relationships and interactions among devices, nodes, or entities within the network infrastructure. Typically, the diagram depicts the physical or logical layout of the network, often as nodes, including routers, switches, servers, computers, and their respective connections. By depicting these elements and their connections, a network diagram helps users, including those of ordinary skill in the art, to understand the structure and flow of data within the network, identify potential bottlenecks or vulnerabilities, plan network expansions or modifications, problem-solve issues, and optimize network performance.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

The technology described herein implements an approach to monitoring and analyzing electronic communications within a distributed network. By monitoring and analyzing electronic communications in a selective manner based on the permissions provided to users within a distributed network, various combinations of outbound data (i.e., data leaving the distributed network) from multiple electronic communications may be analyzed in a sequence of permutations or combinations to determine if the combined outbound data contains sensitive information.

Prior to the invention described herein, identifying data security problems were much more challenging, especially when data was intentionally fragmented or disguised through various tactics. One such tactic resembles money laundering, where data is broken up into smaller pieces and sent to different locations. This technique, known as disparate data, makes it difficult to trace and analyze the data effectively. Additionally, individuals may employ cryptographic methods to modify data, making it harder to detect discrepancies. By utilizing different encryption protocols, these changes may not be immediately visible to systems monitoring network traffic, further complicating the identification process. Similar to money laundering, individuals may employ multi-step processes, routing the data through several intermediaries or collaborators, making it increasingly complex to track the origin and purpose of the data. Collaboration among multiple individuals can further obfuscate the true nature of the data. Innocuous communications sent by different individuals may seem harmless when viewed separately, but when combined, they reveal a hidden motive or malicious intent. Moreover, different collaborators can employ diverse languages and techniques, adding another layer of complexity to the analysis. Countermeasures and effective presentation of such data become crucial to ensure data security within entities.

The invention disclosed herein provides a more effective approach involving the reconstructing and analyzing of electronic communications to uncover attempts to exfiltrate sensitive information from a bank or other organization. The process entails identifying patterns within the electronic communications, such as employee 1 communicating with employees 2 and 3, which indicates potential data transfer. The goal is to detect suspicious activities that may bypass existing controls, as the data being sent out individually might not trigger any alerts. By reconstructing the sequence of events and the involvement of different individuals, it becomes possible to understand the exfiltration process. This approach also addresses the limitations of control systems that rely on specific keywords or phrases, as the engine can piece together snippets of information and trigger appropriate response actions. These actions may include automated attestations, where the sender acknowledges the deletion of the sent data, or staging the data within the organization instead of allowing it to leave.

Accordingly, the present disclosure provides for the reconstruction and analysis of data segments. A network flow analysis is initiated, where indicators are assigned to nodes of a network diagram that have specialized access. A cut along the network diagram is made by the system to isolate the specialized access nodes, and electronic communications are received based on the location of the cut. The contents of the electronic communications are then arranged in a sequence, and the presence of sensitive information is determined based on this arrangement. In some embodiments, one or more subsequent arrangements of the data contained in the electronic communications is made to determine whether a subsequent arrangement contains sensitive information. In some embodiments, the first cut of the network diagram may be removed and a second cut may be made, such as to isolate other nodes with specialized access.

What is more, the present invention provides a technical solution to a technical problem. As described herein, the technical problem includes the fragmentation and obfuscation of data through methods such as breaking it up and sending it to multiple locations, utilizing different cryptography and data modification techniques, collaborating with multiple individuals, and employing other techniques, making it difficult to detect and analyze the data for security purposes. Moreover, the technical problem includes the inability to effectively analyze large amounts of this fragmented data without requiring tremendous computing power. Without a selective method of analyzing these data fragments, slow, inaccurate, or incomplete conclusions about the sensitivity of the data, may be made, which leads to vulnerabilities within the distributed network. The technical solution presented herein allows for the selective receiving of electronic communications, and evaluation of combinations of data contained therein, in order to determine the presence of malicious activity. In particular, the system is an improvement over existing data security systems by allowing for the data exfiltration analysis (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing and manual resources.

FIGS. 1A-1C illustrate technical components of an exemplary distributed computing environment 100 for data protection in a distributed network via reconstruction and analysis of data segments, in accordance with an embodiment of the invention. As shown in FIG. 1A, the distributed computing environment 100 contemplated herein may include a system 130, an endpoint device(s) 140, and a network 110 over which the system 130 and endpoint device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the endpoint device(s) 140 may have a client-server relationship in which the endpoint device(s) 140 are remote devices that request and receive service from a centralized server, i.e., the system 130. In some other embodiments, the system 130 and the endpoint device(s) 140 may have a peer-to-peer relationship in which the system 130 and the endpoint device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The endpoint device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and one or more storage devices 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the one or more storage devices 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the endpoint device(s) 140, in accordance with an embodiment of the disclosure. As shown in FIG. 1C, the endpoint device(s) 140 includes a processor 152, memory 154, an input/output device such as a display 156, a communication interface 158, and a transceiver 160, among other components. The endpoint device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the endpoint device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the endpoint device(s) 140, such as control of user interfaces, applications run by endpoint device(s) 140, and wireless communication by endpoint device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of endpoint device(s) 140 with other devices. External interface 168 may provide, for example, for wired communication in some implementations, or for wireless communication in other implementations, and multiple interfaces may also be used.

The memory 154 stores information within the endpoint device(s) 140. The memory 154 can be implemented as one or more of a computer-readable medium or media, a volatile memory unit or units, or a non-volatile memory unit or units. Expansion memory may also be provided and connected to endpoint device(s) 140 through an expansion interface (not shown), which may include, for example, a SIMM (Single In Line Memory Module) card interface. Such expansion memory may provide extra storage space for endpoint device(s) 140 or may also store applications or other information therein. In some embodiments, expansion memory may include instructions to carry out or supplement the processes described above and may include secure information also. For example, expansion memory may be provided as a security module for endpoint device(s) 140 and may be programmed with instructions that permit secure use of endpoint device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the endpoint device(s) 140 to transmit and/or receive information or commands to and from the system 130 via the network 110. Any communication between the system 130 and the endpoint device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the endpoint device(s) 140 may provide the system 130 (or other client devices) permissioned access to the protected resources of the endpoint device(s) 140, which may include a GPS device, an image capturing component (e.g., camera), a microphone, and/or a speaker.

The endpoint device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to endpoint device(s) 140, which may be used as appropriate by applications running thereon, and in some embodiments, one or more applications operating on the system 130.

The endpoint device(s) 140 may also communicate audibly using audio codec 162, which may receive spoken information from a user and convert the spoken information to usable digital information. Audio codec 162 may likewise generate audible sound for a user, such as through a speaker, e.g., in a handset of endpoint device(s) 140. Such sound may include sound from voice telephone calls, may include recorded sound (e.g., voice messages, music files, etc.) and may also include sound generated by one or more applications operating on the endpoint device(s) 140, and in some embodiments, one or more applications operating on the system 130.

Various implementations of the distributed computing environment 100, including the system 130, and endpoint device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a flow diagram for data protection in a distributed network via reconstruction and analysis of data segments, in accordance with an embodiment of the invention. The process may begin at block 202, where the system initiates a network flow analysis. The initiation of a network flow analysis may be triggered by an input from a user, automated as a recurring analysis within the system, or the like.

Network flow analysis, as will be described at FIG. 3, is used to recognize certain users and/or endpoint device(s) 140 as nodes with special access or security privileges, to identify patterns of their electronic communications, and to provide for the basis of electronic communication data interception in preparation for the analysis of the electronic communication data. In some embodiments, weights may be predetermined by users and assigned to the edges or nodes in a network flow model (i.e., network diagram) to represent the security level or access privileges of different users or endpoint device(s) 140. For example, a higher weight such as 1.0 may be assigned to the edges that connect nodes with special access or security privileges, such as electronic communication servers or firewalls, and a lower weight such as 0.1 may be assigned to the edges that connect regular nodes.

In other embodiments, the system may assign weights to edges in a network based on the volume of data transmitted between nodes and locations external to the network (i.e., exfiltrated to third parties), such that the maximum volume of data exfiltrated throughout the network for a given time period is assigned a predetermined maximum weight, while the minimum volume of data exfiltrated throughout the network for a given time period is assigned a predetermined minimum weight, with data exfiltration volumes between the maximum and minimums being assigned weight proportional therebetween.

The weighted network flow model (i.e., network diagram) of the electronic communication system may then be subjected to various algorithms, such as shortest path or maximum flow, to identify the paths or routes that are used by users with special access or security privileges. This can identify the nodes or devices that are most critical for the security or dependability of the electronic communication system, and to monitor their usage or activity.

In one example, the network flow analysis may be used to identify patterns of electronic communication among different users or groups of users. For example, the system can analyze the frequency, volume, or content of electronic communication messages exchanged between users with special access or security privileges, and compare them to the patterns of electronic communication among regular users. This can help detect anomalies or suspicious behavior that may indicate a security breach or unauthorized access.

In another example, the network flow analysis may be used to track the flow of electronic communication messages among different nodes or devices in the network, and to identify the sources, destinations, or intermediaries of electronic communication messages that are related to certain users or groups of users. This can trace the origin and spread of electronic communication messages that may be of interest for security or forensic purposes.

The network flow analysis implemented herein incorporates the capabilities described above, and specific implementation thereof will be described in detail with respect to FIG. 3, which illustrates a flow diagram for network flow analysis in a distributed network, in accordance with an embodiment of the invention.

Referring now to FIG. 3, the network flow analysis process may begin at block 302, where the system 130 assigns indicators to specialized access nodes of a network diagram comprising nodes predetermined to have specialized access. A node is determined to have "specialized access" if the node has the ability to transfer electronic communication to devices in unrelated computer networks, such as third parties, external vendors, other entities, and so forth.

In some embodiments, the nodes with specialized access may be predetermined by the system 130, such as through identification by a user based on preexisting knowledge of such nodes, through weights predetermined by users assigned to the edges or nodes in the network flow model, or through weights assigned to edges by the system 130 in the network based on the volume of data transmitted between nodes and locations external to the network, such as that which was described previously. In any of these embodiments, indicators are assigned to the specialized access node(s), such as a tag applied to the node(s) in the network diagram to indicate the specialized access nature of the node(s).

The process may continue at block 304, where the system 130 executes a first cut. In the context of electronic communication, a cut helps users identify the minimum number of edges or nodes that need to be removed in order to disconnect the nodes with specialized access or security privileges from the rest of the network, or to isolate them in a separate partition.

For example, there may be a weighted network flow model of the electronic communication system 130 where each edge is assigned a weight that represents the security level or access privileges of the nodes it connects. A minimum cut algorithm may then be implemented to identify the minimum number of edges or nodes that need to be removed in order to disconnect the electronic communication servers or clients with special access or security privileges from the rest of the network.

Once the cut has been identified, either by an algorithm such as a minimum cut algorithm or though predetermined cut selection, the nodes with special access or security privileges may be analyzed in a separate partition such as to monitor the activity and/or communications of nodes with special access or security privileges separately from the regular nodes.

Having identified and tagged (i.e., assigned indicators to) the specialized access nodes, in block 302, a cut is applied to remove predetermined nodes at edges to isolate first specialized access nodes. The predetermined nodes to be removed may be predetermined by user selection, or by an algorithm such as a minimum cut algorithm.

Cutting a network flow model at a specific cut allows for the selective reception of data transmitted along that cut by diverting the flow of data between the two sides. Specifically, this data is that of electronic communications. Filtering mechanisms may be implemented at the cut to separate and redirect the desired electronic communication data. This may be accomplished using various network technologies and protocols such as network switches or routers configured with access control lists (ACLs) or firewall rules to filter the traffic based on specific criteria, such as source/destination IP addresses, ports, or protocols. After the filtering mechanisms are in place, the flow of electronic communication data may then be directed along the desired path. This can involve routing the filtered data to specific receiving nodes or forwarding it to a storage device 110 or the system 130.

As shown at block 306, where the system 130 captures a first plurality of electronic communications at the first specialized access nodes. It shall be appreciated that each node may send and/or receive multiple electronic communications at any given point during the capturing process, which occurs over a predetermined length of time. In other embodiments, the capturing occurs for a predetermined number of electronic communications for a selected node(s).

Each of the plurality of electronic communications comprises a corresponding discrete data segment. This discrete data segment may be part of the body of the electronic communication, such as the body of an email, or may be the attachment of the electronic communication, such as the attachment of an email. Alternatively, in instances where the electronic communication is a file transfer, the discrete data segment may be the file that is being transferred.

For example, a discrete data segment may be the body of an electronic communication that is a portion of computer code, a portion of a document, or a portion of any other sensitive material that when combined with one or more other discrete data segment(s) forms the entirety of the computer code, document, or other sensitive material.

At this point, the system 130 captures (i.e., intercepts) each electronic communication, and there may be little to no analysis involved other than the determination that the electronic communication passes through (i.e., is sent from, or received by) the specialized access node(s) isolated as a result of the first cut. However, in some embodiments, after capturing an electronic communication, the system 130 may employ techniques to isolate discrete data segments from the rest of the electronic communication. This process involves parsing and extracting relevant data from the captured electronic communication and separating it from irrelevant or extraneous information by employing algorithms or rules-based approaches to identify and extract specific data elements, such as sender and recipient information, timestamps, subject lines, or message content.

Once the discrete data segments are isolated, the system 130 may the transform the discrete data segments from unstructured to structured data. This transformation may involve organizing and formatting the extracted data into a standardized format suitable for analysis and storage. Techniques like natural language processing (NLP) and text mining may be used to extract meaning, entities, and relationships from the unstructured data. The extracted information can then be structured into databases, tables, or other organized data formats that enable efficient querying, analysis, and storage.

As illustrated in block 308, in some embodiments, the system 130 may store the corresponding discrete data segments for each of the first plurality of electronic communications in a first storage device 110. The structured or unstructured discrete data segments are stored in a storage device 110 such as a database or data warehouse for further analysis, retrieval, and long-term preservation, as will be discussed and described fully herein. Structured data allows for easier searching, indexing, and analysis of the captured electronic communication, enabling more effective information retrieval and insights extraction for various purposes like compliance, security, or business intelligence.

In some embodiments, prior to isolating the discrete data segments from their corresponding electronic communication, each discrete data segment may be associated in a database of a storage device 110 with its corresponding electronic communication for tracing purposes and use in subsequent process steps to quarantine, reject, forward, send, or otherwise implement a disposition on the electronic communication based on the findings of the system 130 relative to the sensitivity of information the electronic communication is associated with. A database schema may be developed which incorporates tables representing the electronic communications and associated data segments. In some embodiments, an electronic communication table may be created to store communication records, including relevant information such as communication ID, sender, recipient, timestamp, and/or other metadata. Additionally, or alternatively, a data segment table may be created to store the data segments, including columns for the segment ID and the actual data. The data segment table may include a foreign key column to reference a communication identifier ("communication ID") in the electronic communication table. Accordingly, this foreign key creates a link between a data segment and its corresponding electronic communication and may be referenced by the system 130 during operations where the discrete data segment and electronic communications are separated.

As shown in block 310, in some embodiments the system 130 may remove the first cut after a predetermined time interval. In other embodiments, the system 130 may remove the first cut after a predetermined number of electronic communications captured, either as a whole between all of the specialized access nodes, or for any one given specialized access node.

The process may continue at block 312, where the system 130 executes a second cut, wherein the second cut removes predetermined nodes at edges to isolate second specialized access nodes. It shall be appreciated that the specialized access nodes isolated by the first cut may only represent a small portion of the total number of specialized access nodes within a distributed network. Reasons for this include an improved computational efficiency and analysis accuracy as a result of the evaluation of a small subset of specialized access nodes. Accordingly, there may be other specialized access nodes (i.e., second special access nodes) in the distributed network that the system 130 may collect electronic communications originating therefrom or transferring thereto. Thus, in a similar manner as was described with respect to the first cut in block 304, a second cut may be applied to the network diagram to capture these electronic communications related to the second specialized access nodes.

As shown at block 314, the system 130 may then capture a second plurality of electronic communications at the second specialized access nodes, as isolated by the second cut, wherein each of the second plurality of electronic communications comprises a corresponding discrete data segment. The capturing of the electronic communications at the second specialized access nodes is performed in an identical manner as that which is implemented to capture the electronic communications of the first specialized access nodes, as described fully with respect to block 306.

In some embodiments, the process may continue at block 316, where the system 130 stores each of the discrete data segments in the first storage device 110. The discrete data segments from the second specialized access nodes are stored in the same storage device 110 as the discrete data segments from the first specialized access nodes to simplify and streamline the analysis, such that discrete data segments for analysis are retrieved form the same storage device 110. Similarly, in some embodiments the storage of discrete data segments from multiple groups of specialized access nodes in the same storage device 110 may facilitate the removal of duplicates of discrete data segments from the storage device 110 to further increase analytical efficiency. As such, in the event that the first cut and the second cut isolate specialized access nodes that are common between the first and second cuts, any duplicates of discrete data segments captured may be removed from the storage device 110 to eliminate misanalysis.

As illustrated above, the system 130 makes a first cut in the network flow model to isolate first specialized access nodes and their corresponding discrete data segments. Subsequently, a second cut is made to isolate second specialized access nodes and their respective data segments. However, it is important to note that in some embodiments, the system 130 is not limited to just these two cuts. Instead, it may continue with additional sequences of one or more cuts that are unique from the first and second cuts.

These additional cuts serve the purpose of collecting discrete data segments from other specialized access nodes that were not accounted for in the first and second cuts. By performing these additional cuts, the system 130 ensures comprehensive monitoring of electronic communications to or from all specialized access nodes. This is crucial because electronic communications are ongoing over time, and new specialized access nodes may emerge or existing ones may change.

Furthermore, the system 130 operates in a repetitive manner, executing the sequence of executing, capturing, storing, and removing various cuts. This repetition occurs in cycles on an ongoing basis, allowing the system 130 to maintain continuous surveillance of electronic communications. This iterative process ensures that the system 130 remains up to date and adaptable to the dynamic nature of the distributed network, thereby enabling efficient and effective monitoring of specialized access nodes and their associated data segments.

Referring back now to FIG. 2, the process may continue at block 204, where the system 130 constructs a first arrangement of a selected group of the corresponding discrete data segments.

To systematically arrange these discrete data segments in all possible combinations, in some embodiments the system 130 utilizes combination algorithms like permutation or combination. First, a list or array containing all the discrete data segments may be generated, then a permutation algorithm may be employed to generate all possible permutations of the list, creating a new list for each possible order of the data segments. Alternatively, in some embodiments, if the order matters but repetition is allowed, a combination algorithm may be used to generate all possible combinations of the list, resulting in a new list for each combination of data segments.

Accordingly, the combination algorithm in implemented which results in a first arrangement. For example, one discrete data segment may contain the text "The recipe calls for" while another discrete data segment may contain the words "60% Component A and 10% Component B." As previously noted, discrete data segments could contain any number of sensitive materials, such as source codes, trade secrets, personal information, financial statements, and so forth. As such, examples described herein are for illustrative purposes only to facilitate the understanding of embodiments of the invention and are not to be construed as limitations.

It shall also be appreciated that although the example used for illustrative purposes herein contains only two (2) discrete data segments in various arrangements, embodiments of the invention also allow for the arrangement of any number of a plurality of discrete data segments, such as three (3), four (4), five (5), and so forth. For example, in embodiments for three (3) discrete data segments, one discrete data segment may contain the text "The recipe calls for", another discrete data segment may contain the text "60% Component A and 10% Component B", and yet another discrete data segment may contain the text "to be combined in a mixing device." As will be appreciated by one skilled in the art, the number of arrangements of X number of data segments is X! (i.e., X factorial number of combinations). The first position of any given arrangement will accommodate the placement of X number of discrete data segments, the next position will accommodate X−1 number of discrete data segments of any discrete data segments not chosen for the first position of the arrangement, the next position will accommodate X−2 number of discrete data segments of any discrete data segments not chosen for the first and second positions of the arrangement, and so forth until each of a predetermined number of discrete data segments is used one time in the arrangement.

In some embodiments, the number of discrete data segments to be arranged may be predetermined by a user in order to maximize the efficiency of the system 130. In other embodiments, the combination algorithm may systematically and iteratively form combinations of two (2) discrete data segments, then automatically move to form combinations of three (3) discrete data segments, and so forth.

In keeping with the example, the first arrangement produced by the combination algorithm may place the second discrete data segment before the first discrete data segment, such as to form the combined data segment as "60% Component A and 10% Component B. The recipe calls for".

As shown at block 206, the system 130 may determine a presence of sensitive information based on the first arrangement using a sensitive information detection engine. To determine the presence of sensitive information within the first arrangement of data segments, the system 130 employs a sensitive information detection engine that utilizes a machine learning engine which has been trained using suspect electronic communications stored in a separate storage device 110. During the training, the machine learning engine learns from labeled examples of suspect electronic communications to identify patterns and features associated with sensitive information. Once completed, the first arrangement of data segments is processed by the sensitive information detection engine, where the trained machine learning engine is applied to the first arrangement of data segments to analyze the arrangement and identify patterns or characteristics associated with the presence of sensitive information.

Continuing with the example, despite containing every element of the trade secret recipe, the first arrangement of "60% Component A and 10% Component B. The recipe calls for" is generally nonsensical and is not likely to be recognized by the machine learning engine as being associated with sensitive information. To illustrate this further with another example of a slight variation, the first and second discrete data segments could be completely unrelated, and further form a nonsensical arrangement such as "60% Component A and 10% Component B. The revenue for Q1 was $X million."

In some embodiments, arrangements of data segments, such as the first arrangement of data segments, may be tagged or classified according to the output of the machine learning engine. For example, if it is determined that there is a high likelihood, based on a predetermined threshold of a confidence interval, that the arrangement of data segments contains sensitive information, the system 130 may apply a data tag to the arrangements of data segment, the first discrete data segment, and/or the second discrete data segment to indicate that the arrangement of data segments contains sensitive information.

In some embodiments, the first arrangement, if it has been determined by the sensitive information detection engine to contain sensitive information, may be stored in an array or a database table, to maintain a record of the combination. Such an array or database may then be stored in a storage device 110 of the system 130. Additionally, or alternatively, the first arrangement may be provided as training data to the machine learning engine of the sensitive information engine.

As shown at block 208, the system 130 may the construct a second arrangement of the selected group of the discrete data segments. In keeping with the example, the second arrangement produced by the combination algorithm may place the first discrete data segment before the second discrete data segment, such as to form the combined data segment as "The recipe calls for 60% Component A and 10% Component B."

As shown at block 210, the system 130 may determine the presence of sensitive information based on the second arrangement using the sensitive information detection engine. The sensitive information detection engine functions in the same method as described with respect to block 206. However, now the second arrangement has been subjected to the sensitive information detection engine, and as such the second arrangement "The recipe calls for 60% Component A and 10% Component B." being a sensical text sequence is now likely to be recognized by the machine learning engine as being associated with sensitive information, assuming that the machine learning engine has been trained using training data similar to recognize that the second arrangement is a recipe that contains trade secret or other confidential information.

As previously described with respect to FIG. 3, each of the discrete data segments that form an arrangement has previously been associated with its corresponding electronic communication in a database. Accordingly, if an arrangement, such as the first arrangement, second arrangement, or any other further arrangements, is determined by the sensitive information detection engine to have sensitive information, the system 130 may apply a tag designating "suspect electronic communication" to the corresponding electronic communications in the database. As such, the system 130 is able to identify suspected nefarious communications, quarantine, send, or delete electronic communications, monitor patterns, or the like.

Accordingly, the process may continue at block 212, where the system 130 stores in a second storage device 110, for a predetermined length of time, a suspect electronic communication when the sensitive information detection engine determines the presence of sensitive information. It shall be appreciated that the sensitive information detection engine may identify arrangements of discrete data segments that are highly suspicious of being representative of sensitive information, but such arrangements may not contain enough sensitive information yet to be valuable to malfeasant users. Value of such arrangements may be increased as additional sensitive information is transmitted or otherwise communicated within the distributed network for exfiltration. Accordingly, to allow for the future identification of sensitive information when combined with future electronic communications, a disposition action of the corresponding electronic communication(s) may not yet be taken. Instead, the electronic communication(s) is stored in a storage device 110, preferably a separate storage device 110, for a predetermined amount of time, such as one (1) day, one (1) week, one (1) year, or the like. In some embodiments the electronic communication(s) may be stored in the same storage device 110 as the arrangements, discrete data segments, etc.

It shall be appreciated that suspect electronic communications can vary in size and scope anywhere from a communication of a complete database to a discrete data segment that requires the combination/arrangement with multiple other discrete data segments to have value. Accordingly, the system 130 may prompt a user associated with the entity who is responsible for managing data security to provide for a disposition of the suspect electronic communication. This prompt may be transmitted to the user interface of an endpoint device(s) 140 and provide for several disposition selections to be made by the user associated with the entity and carried out by the system 130. Blocks 214a and 214b illustrate two of the disposition selections available to the user associated with the entity.

In some embodiments, as illustrated at block 214a, the system 130, subsequent the predetermined length of time, the system 130 may return the suspect electronic communication to a source, such as returning the electronic communication to the sender. In some embodiments, this return of the suspect electronic communication may be accompanied by an attached message to warn the attempted sending user of the potential of sensitive information leaving the distributed network.

Additionally, or alternatively, in some embodiments as illustrated at block 214b, the system 130, subsequent the predetermined length of time, completes a transfer of the suspect electronic communication to a destination. It shall be appreciated that not all suspect electronic communications warrant the need to completely block the transmission/sending of the electronic communication, and instead the entity may wish to continue to gather more data on suspected malfeasant users while not tipping off the suspected malfeasant users of the ongoing investigation. Thus, the electronic communication may be sent to the destination. Although not depicted graphically in FIG. 2, additional disposition selections may also be available on the user interface, such as the deletion of the suspect electronic communication.

In some embodiments, after completing the transfer of the suspect electronic communication, a retained copy of the suspect electronic communication is stored in a second storage device 110 such as for continued observance of the parties involved in the suspect electronic communication. The storage of such suspect electronic communications may serve as record-keeping or as a repository for information when building a case against a suspected malfeasant user.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for data protection in a distributed network via reconstruction and analysis of data segments, the system comprising:
   a processing device; and
   a non-transitory storage device containing instructions when executed by the processing device causes the processing device to perform process steps of:
   initiating a network flow analysis, wherein the network flow analysis comprises:
     assigning indicators to specialized access nodes of a network diagram comprising nodes predetermined to have specialized access;
     executing a first cut, wherein the first cut removes predetermined nodes at edges to isolate first specialized access nodes;
     capturing a first plurality of electronic communications at the first specialized access nodes, wherein each of the first plurality of electronic communications comprises a corresponding discrete data segment;
     storing the corresponding discrete data segments for each of the first plurality of electronic communications in a first storage device;
     removing the first cut after a predetermined time interval;
     executing a second cut, wherein the second cut removes predetermined nodes at edges to isolate second specialized access nodes;
     capturing a second plurality of electronic communications at the second specialized access nodes, wherein each of the second plurality of electronic communications comprises a corresponding discrete data segment; and
     storing the corresponding discrete data segments for each of the second plurality of electronic communications in the first storage device;
     constructing a first arrangement of a selected group of the corresponding discrete data segments; and
     determining a presence of sensitive information based on the first arrangement using a sensitive information detection engine.

2. The system of claim 1, wherein executing the instructions further causes the processing device to perform the process steps of:
   constructing a second arrangement of the selected group of the discrete data segments; and
   determining the presence of sensitive information based on the second arrangement using the sensitive information detection engine.

3. The system of claim 1, wherein executing the instructions further causes the processing device to perform the process steps of:
   storing in a second storage device, for a predetermined length of time, a suspect electronic communication when the sensitive information detection engine determines the presence of sensitive information; and
   executing, subsequent the predetermined length of time, one selected from the group consisting of: (i) returning the suspect electronic communication to a source and (ii) completing a transfer of the suspect electronic communication to a destination.

4. The system of claim 3, wherein after completing the transfer of the suspect electronic communication, a retained copy of the suspect electronic communication is stored in the second storage device.

5. The system of claim 1, wherein the specialized access comprises an ability for the specialized access nodes to transfer electronic communication to devices in unrelated computer networks.

6. The system of claim 1, wherein the sensitive information detection engine comprises a machine learning engine, wherein the machine learning engine is trained using suspect electronic communications in a second storage device.

7. A computer program product for data protection in a distributed network via reconstruction and analysis of data segments, the computer program product comprising a non-transitory computer-readable medium comprising code causing an apparatus to:
    initiate a network flow analysis, wherein the network flow analysis comprises the steps of:
        assigning indicators to specialized access nodes of a network diagram comprising nodes predetermined to have specialized access;
        executing a first cut, wherein the first cut removes predetermined nodes at edges to isolate first specialized access nodes;
        capturing a first plurality of electronic communications at the first specialized access nodes, wherein each of the first plurality of electronic communications comprises a corresponding discrete data segment;
        storing the corresponding discrete data segments for each of the first plurality of electronic communications in a first storage device;
        removing the first cut after a predetermined time interval;
        executing a second cut, wherein the second cut removes predetermined nodes at edges to isolate second specialized access nodes;
        capturing a second plurality of electronic communications at the second specialized access nodes, wherein each of the second plurality of electronic communications comprises a corresponding discrete data segment; and
        storing the corresponding discrete data segments for each of the second plurality of electronic communications in the first storage device;
    construct a first arrangement of a selected group of the corresponding discrete data segments; and
    determine a presence of sensitive information based on the first arrangement using a sensitive information detection engine.

8. The computer program product of claim 7, wherein the code further causes the apparatus to:
    construct a second arrangement of the selected group of the discrete data segments; and
    determine the presence of sensitive information based on the second arrangement using the sensitive information detection engine.

9. The computer program product of claim 7, wherein the code further causes the apparatus to:
    store in a second storage device, for a predetermined length of time, a suspect electronic communication when the sensitive information detection engine determines the presence of sensitive information; and
    execute, subsequent the predetermined length of time, one selected from the group consisting of: (i) returning the suspect electronic communication to a source and (ii) completing a transfer of the suspect electronic communication to a destination.

10. The computer program product of claim 9, wherein after completing the transfer of the suspect electronic communication, a retained copy of the suspect electronic communication is stored in the second storage device.

11. The computer program product of claim 7, wherein the specialized access comprises an ability for the specialized access nodes to transfer electronic communication to devices in unrelated computer networks.

12. The computer program product of claim 7, wherein the sensitive information detection engine comprises a machine learning engine, wherein the machine learning engine is trained using suspect electronic communications in a second storage device.

13. A method for data protection in a distributed network via reconstruction and analysis of data segments, the method comprising:
    initiating a network flow analysis, wherein the network flow analysis comprises the steps of:
        assigning indicators to specialized access nodes of a network diagram comprising nodes predetermined to have specialized access;
        executing a first cut, wherein the first cut removes predetermined nodes at edges to isolate first specialized access nodes;
        capturing a first plurality of electronic communications at the first specialized access nodes, wherein each of the first plurality of electronic communications comprises a corresponding discrete data segment;
        storing the corresponding discrete data segments for each of the first plurality of electronic communications in a first storage device;
        removing the first cut after a predetermined time interval;
        executing a second cut, wherein the second cut removes predetermined nodes at edges to isolate second specialized access nodes;
        capturing a second plurality of electronic communications at the second specialized access nodes, wherein each of the second plurality of electronic communications comprises a corresponding discrete data segment; and
        storing the corresponding discrete data segments for each of the second plurality of electronic communications in the first storage device;
    constructing a first arrangement of a selected group of the corresponding discrete data segments; and
    determining a presence of sensitive information based on the first arrangement using a sensitive information detection engine.

14. The method of claim 13, wherein the method further comprises:
    constructing a second arrangement of the selected group of the discrete data segments; and
    determining the presence of sensitive information based on the second arrangement using the sensitive information detection engine.

15. The method of claim 13, wherein the method further comprises:
    storing in a second storage device, for a predetermined length of time, a suspect electronic communication when the sensitive information detection engine determines the presence of sensitive information; and
    executing, subsequent the predetermined length of time, one selected from the group consisting of: (i) returning the suspect electronic communication to a source and (ii) completing a transfer of the suspect electronic communication to a destination.

16. The method of claim 15, wherein after completing the transfer of the suspect electronic communication, a retained copy of the suspect electronic communication is stored in the second storage device.

17. The method of claim 13, wherein the sensitive information detection engine comprises a machine learning engine, wherein the machine learning engine is trained using suspect electronic communications in a second storage device.

* * * * *